United States Patent
Wu et al.

(10) Patent No.: US 12,449,716 B2
(45) Date of Patent: Oct. 21, 2025

(54) OPTICAL ELEMENT DRIVING MECHANISM

(71) Applicant: TDK TAIWAN CORP., Taoyuan (TW)

(72) Inventors: Ya-Hsiu Wu, Taoyuan (TW); Ying-Jen Wang, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 430 days.

(21) Appl. No.: 18/089,179

(22) Filed: Dec. 27, 2022

(65) Prior Publication Data

US 2023/0204942 A1    Jun. 29, 2023

Related U.S. Application Data

(60) Provisional application No. 63/266,034, filed on Dec. 27, 2021.

(51) Int. Cl.
| | | |
|---|---|---|
| *G03B 5/00* | (2021.01) | |
| *G02B 7/08* | (2021.01) | |
| *G02B 26/08* | (2006.01) | |
| *G02B 27/00* | (2006.01) | |
| *G02B 27/64* | (2006.01) | |

(Continued)

(52) U.S. Cl.
CPC .............. *G03B 5/00* (2013.01); *G02B 7/08* (2013.01); *G02B 26/08* (2013.01); *G02B 27/0006* (2013.01); *G02B 27/646* (2013.01); *H04N 23/55* (2023.01); *H04N 23/6812* (2023.01); *H04N 23/687* (2023.01); *G03B 2205/0015* (2013.01); *G03B 2205/0069* (2013.01); *H02K 41/0354* (2013.01); *H04N 23/51* (2023.01)

(58) Field of Classification Search
CPC .. G02B 27/0006; G02B 27/646; G02B 5/005; G02B 7/04; G02B 27/642; H04N 23/55; H04N 23/6812; H04N 23/687; H04N 23/51; H04N 23/00; H04N 23/54; G03B 2205/0015; G03B 2205/0069; G03B 3/10; G03B 5/06; G03B 30/00; H02K 41/0354; B60S 1/60; B08B 7/02; B60R 11/00; B60R 11/04; B60R 2011/0026; B60R 2011/004
See application file for complete search history.

(56) References Cited

U.S. PATENT DOCUMENTS 11,125,920 B2 * 9/2021 Fan ..................... F03G 7/06143
11,422,334 B2 * 8/2022 Fu ......................... G02B 26/085

(Continued)

FOREIGN PATENT DOCUMENTS

CN       215416061 U     1/2022

OTHER PUBLICATIONS

An Office Action in corresponding CN Application No. 202223499003.3 dated May 16, 2023 is attached, 1 page.

*Primary Examiner* — Marin Pichler
(74) *Attorney, Agent, or Firm* — MUNCY, GEISSLER, OLDS & LOWE, P.C.

(57) ABSTRACT

An optical element driving mechanism used for driving an optical element is provided. The optical element driving mechanism includes a fixed portion, a driving assembly, and a support assembly. The driving assembly is used for driving the optical element to move relative to the fixed portion in a first dimension. The optical element is movable relative to the fixed portion through the support assembly.

17 Claims, 11 Drawing Sheets

(51) Int. Cl.
  *H04N 23/55*   (2023.01)
  *H04N 23/68*   (2023.01)
  *H02K 41/035*   (2006.01)
  *H04N 23/51*   (2023.01)

(56) References Cited

U.S. PATENT DOCUMENTS

| | | | |
|---|---|---|---|
| 11,448,850 B2* | 9/2022 | Tsai | G06F 1/1686 |
| 11,630,280 B2* | 4/2023 | Hu | G02B 7/02 |
| | | | 359/822 |
| 11,947,182 B2* | 4/2024 | Hu | H04N 23/687 |
| 2016/0238834 A1* | 8/2016 | Erlich | G02B 26/101 |
| 2022/0269030 A1* | 8/2022 | Wu | G02B 7/02 |
| 2022/0269034 A1* | 8/2022 | Wu | H04N 23/687 |
| 2023/0066834 A1* | 3/2023 | Wu | G02B 7/08 |
| 2023/0266561 A1* | 8/2023 | Hsu | G02B 27/646 |
| | | | 359/823 |
| 2023/0266635 A1* | 8/2023 | Hsu | G03B 3/10 |
| | | | 396/510 |
| 2023/0341653 A1* | 10/2023 | Hsu | G02B 7/08 |
| 2024/0085718 A1* | 3/2024 | Zhuang | G02B 27/646 |
| 2024/0142858 A1* | 5/2024 | Wu | G02B 13/0065 |
| 2024/0152033 A1* | 5/2024 | Chao | G03B 30/00 |
| 2025/0110307 A1* | 4/2025 | Hu | G02B 13/0065 |

* cited by examiner

OPTICAL ELEMENT DRIVING MECHANISM

CROSS REFERENCE TO RELATED APPLICATIONS

This application claims the benefit of U.S. Provisional Application No. 63/266,034, filed on Dec. 27, 2021, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical element driving mechanism used for driving an optical element is provided in some embodiments of the present disclosure. The optical element driving mechanism includes a fixed portion, a driving assembly, and a support assembly. The driving assembly is used for driving the optical element to move relative to the fixed portion in a first dimension. The optical element is movable relative to the fixed portion through the support assembly.

In some embodiments, the support assembly includes an intermediate element, a first connecting element, and a second connecting element. The intermediate element is strip-shaped and extending along a first axis. The first connecting element has a first opening used for accommodating at least a portion of the intermediate element. The second connecting element has a second opening used for accommodating at least a portion of the intermediate element.

In some embodiments, the first opening has a closed structure. When viewed in a first direction, the first connecting element is closer to a center of the optical element than the driving assembly. The first direction and the first axis are perpendicular. A second axis is perpendicular to the first axis. The second axis is perpendicular to the first direction. A third axis is parallel to the first direction.

In some embodiments, the second opening has a closed structure. A first gap is between the first connecting element and the second connecting element. The opening of the optical element overlaps the first gap when viewed in the first direction. The optical element driving mechanism further includes a movable portion used for connecting to the optical element and being movable relative to the fixed portion.

In some embodiments, the movable portion has a third opening corresponding to the first connecting element. The third opening corresponds to the second connecting element. At least a portion of the first connecting element is exposed from the third opening when viewed in the first direction.

In some embodiments, the movable portion further includes a first movable portion surface facing the first connecting element, and a second movable portion surface facing the first connecting element. The first movable portion surface is perpendicular to the second axis. The first movable portion surface and the second movable portion surface are not parallel. The second movable portion surface is perpendicular to the first axis.

In some embodiments, the first movable portion surface and the second movable portion surface are not parallel. The second movable portion surface is perpendicular to the first axis. A minimum distance between the first movable portion surface and the first connecting element is different from a minimum distance between the second movable portion surface and the first connecting element.

In some embodiments, the first gap is greater than the minimum distance between the first movable portion surface and the first connecting element. The first gap is less than the minimum distance between the second movable portion surface and the first connecting element.

In some embodiments, the minimum distance between the first movable portion surface and the first connecting element is less than the minimum distance between the second movable portion surface and the first connecting element. The first movable portion surface and the second movable portion surface are perpendicular. The first dimension is rotation relative to a rotational axis. The rotational axis is parallel to the first axis.

In some embodiments, the driving assembly includes a first magnetic permeable element including a first magnetic permeable portion, a first coil disposed on the first magnetic permeable element, and a first magnetic element corresponding to the first magnetic permeable portion.

In some embodiments, the intermediate element passes through the first magnetic element. The first magnetic permeable portion is adjacent to the rotational axis. The first magnetic permeable portion has an arc-shaped surface facing the rotational axis. A distance between a center of the first magnetic permeable portion and a center of the first magnetic element is greater than 0 in the first axis.

In some embodiments, the first magnetic element does not overlap the first magnetic permeable portion when viewed along the first axis. The first magnetic element does not overlap the first magnetic permeable portion when viewed along the second axis. At least a portion of the first connecting element overlaps the first magnetic element in a direction that the first axis extends.

In some embodiments, wherein the driving assembly further includes a second magnetic permeable element including a second magnetic permeable portion, a second coil disposed on the second magnetic permeable element, and a second magnetic element corresponding to the second magnetic permeable portion.

In some embodiments, the intermediate element passes through the second magnetic element. The first connecting element is between the first magnetic element and the second magnetic element when viewed in the first direction. The third opening and the first magnetic element do not overlap each other when viewed in the first direction. The third opening and the second magnetic element do not overlap each other when viewed in the first direction. Centers of the first coil and the second coil do not overlap each other in the direction that the first axis extends.

In some embodiments, a winding axis of the first coil is not parallel to a winding axis of the second coil. The winding axis of the first coil is not parallel to the second axis. The winding axis of the first coil is not perpendicular to the second axis. The winding axis of the second coil is not parallel to the second axis. The winding axis of the second coil is not perpendicular to the second axis.

In some embodiments, the fixed portion includes a first fixed portion surface, a first accommodating portion used for accommodating the first coil, and a second accommodating portion used for accommodating the first magnetic permeable element.

In some embodiments, the first accommodating portion is formed on the first fixed portion surface. The second accommodating portion is formed on the first fixed portion surface. A depth of the second accommodating portion is less than a depth of the first accommodating portion. The first accommodating portion has a first accommodating portion surface facing the first coil. The first accommodating portion surface is perpendicular to the first axis. a second gap is between the first accommodating portion and the first coil. The first coil is affixed on the fixed portion through a first adhesive element. The first adhesive element is in direct contact with the first accommodating portion surface. At least a portion of the first adhesive element is in the second gap. The first coil and the second coil do not overlap each other in the direction that the first axis extends.

In some embodiments, the optical element driving mechanism further includes a sensing assembly used for detecting the movement of the movable portion relative to the fixed portion. The sensing assembly includes a first reference element, a sensing element corresponding to the first reference element, and a balance element, wherein the first connecting element is between the first reference element and the balance element. The first coil and the first magnetic element are arranged in a direction different a direction that the first reference element and the balance element arranged. At least a portion of the first reference element overlaps the balance element in a direction that the second axis extends. The first reference element includes magnetic. The balance element includes magnetic.

In some embodiments, the optical element driving mechanism further includes a circuit element electrically connected to the sensing assembly. The first coil is electrically connected to the circuit assembly. The fixed portion further includes a bottom surface facing the circuit assembly, a bottom plate, wherein the bottom surface is on the bottom plate, a first block wall protruding from the bottom surface, and a fourth opening corresponding to the sensing assembly.

In some embodiments, the bottom surface is perpendicular to the second axis. The fourth opening is formed on the bottom plate. At least a portion of the bottom plate overlaps the sensing assembly when viewed along the first axis. The circuit assembly is plate-shaped. A height of the first block wall is greater than a thickness of the circuit assembly. The circuit assembly includes a first electrical connecting portion. The first block wall is between the first electrical connecting portion and the driving assembly when viewed along the second axis. The first coil is electrically connected to the circuit assembly through the first electrical connecting portion. A center of the first reference element overlaps a center of the balance element in the direction that the second axis extends.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1A:
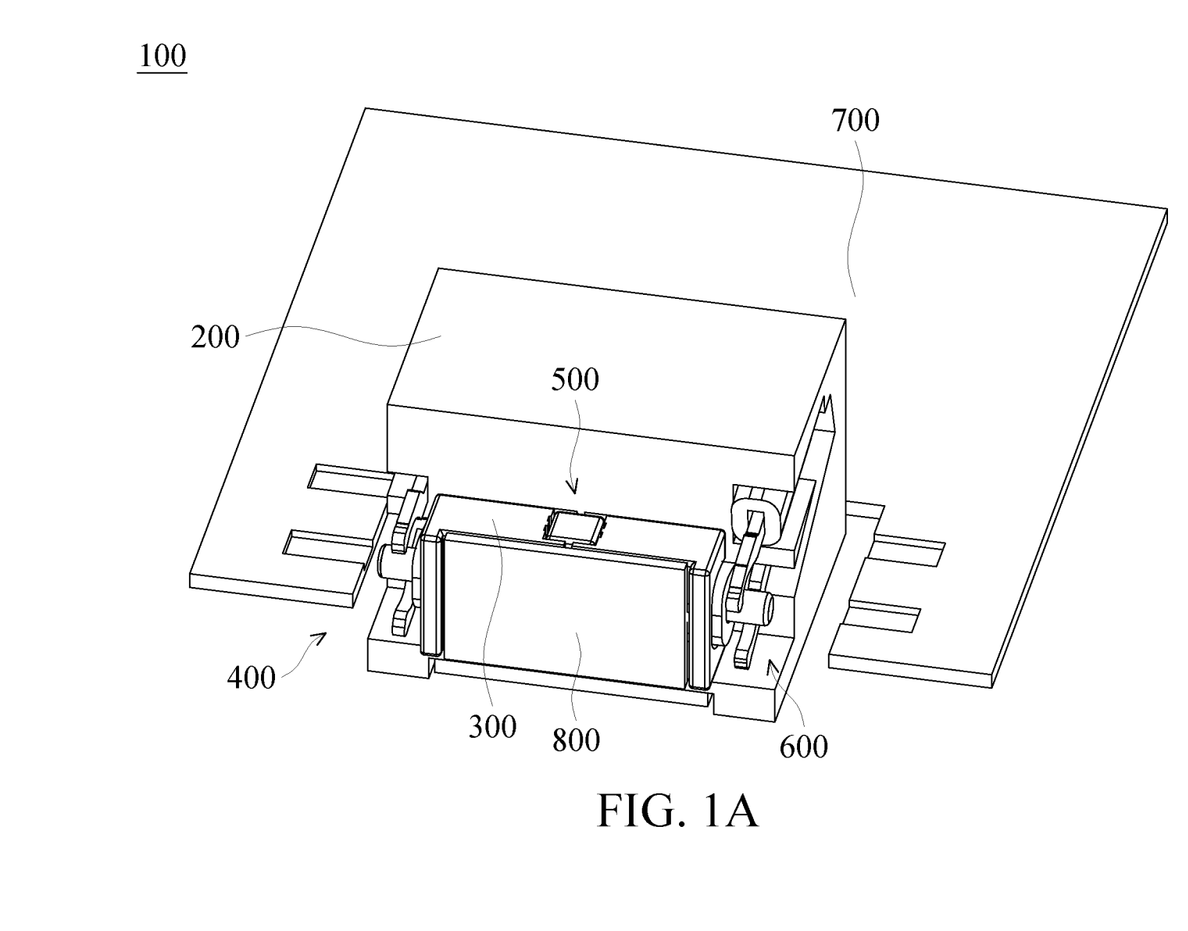
FIG. 1A, FIG. 1B, FIG. 1C, and FIG. 1E are schematic views of an optical element driving mechanism viewed from different directions in some embodiments of the present disclosure.
Figure 1B:
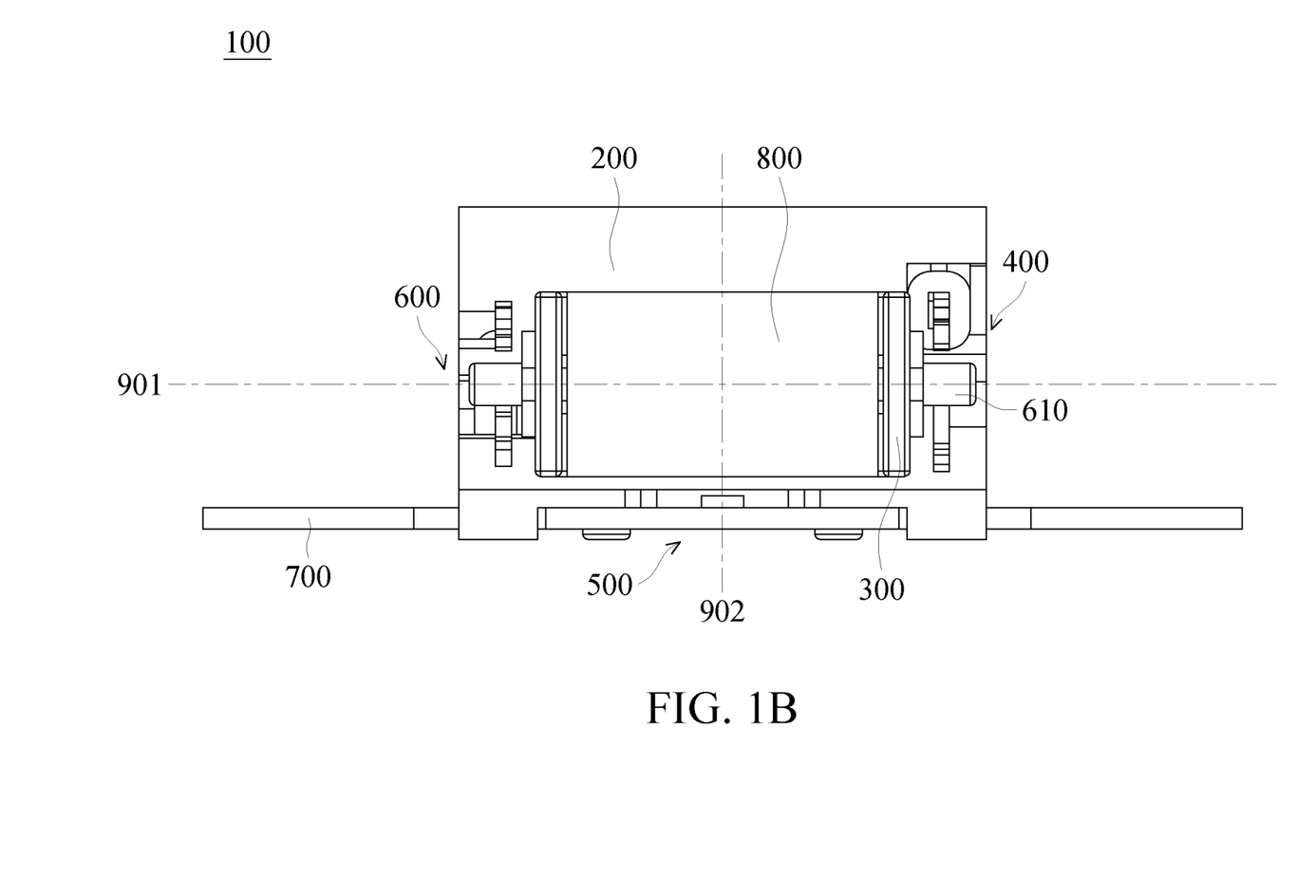
Figure 1C:
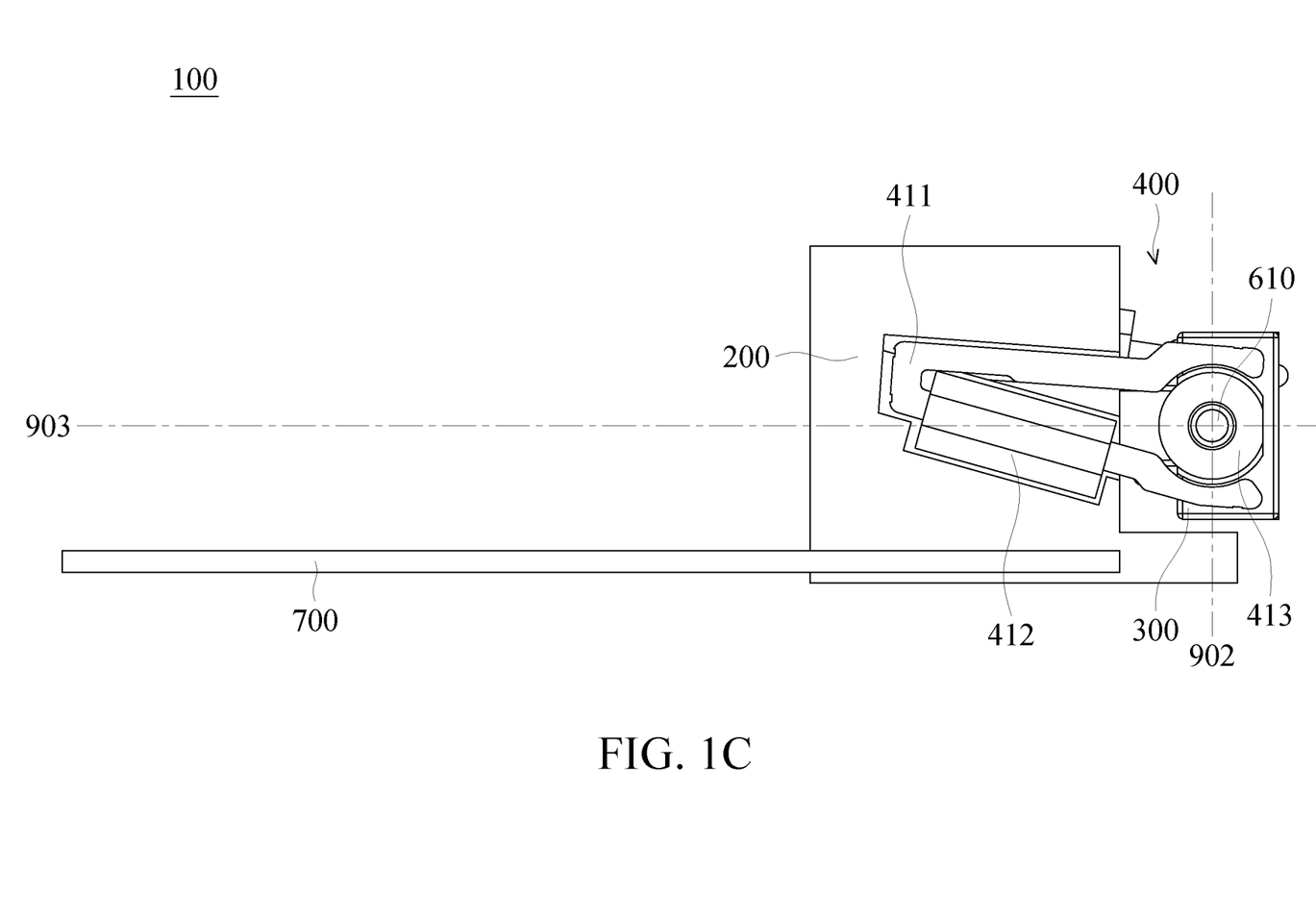
Figure 1D:
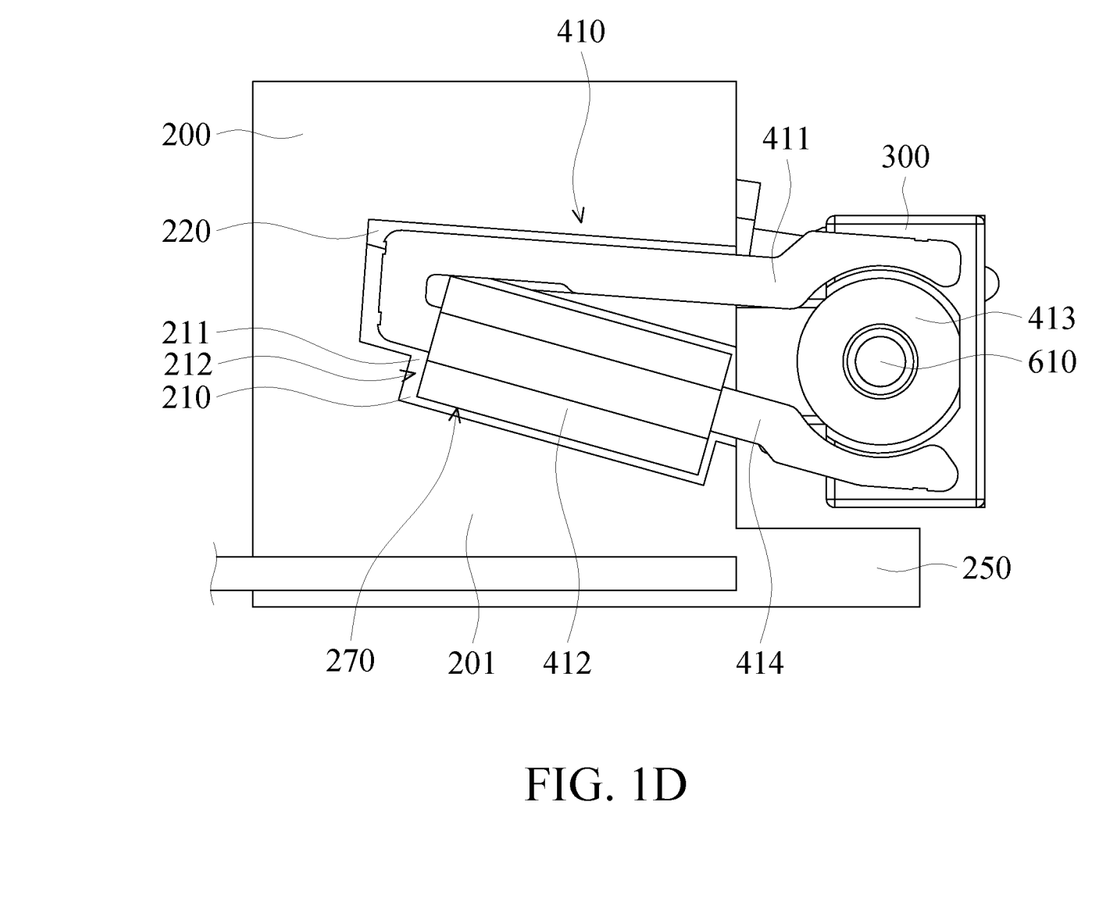
FIG. 1D is an enlarged view of FIG. 1C.
Figure 1E:
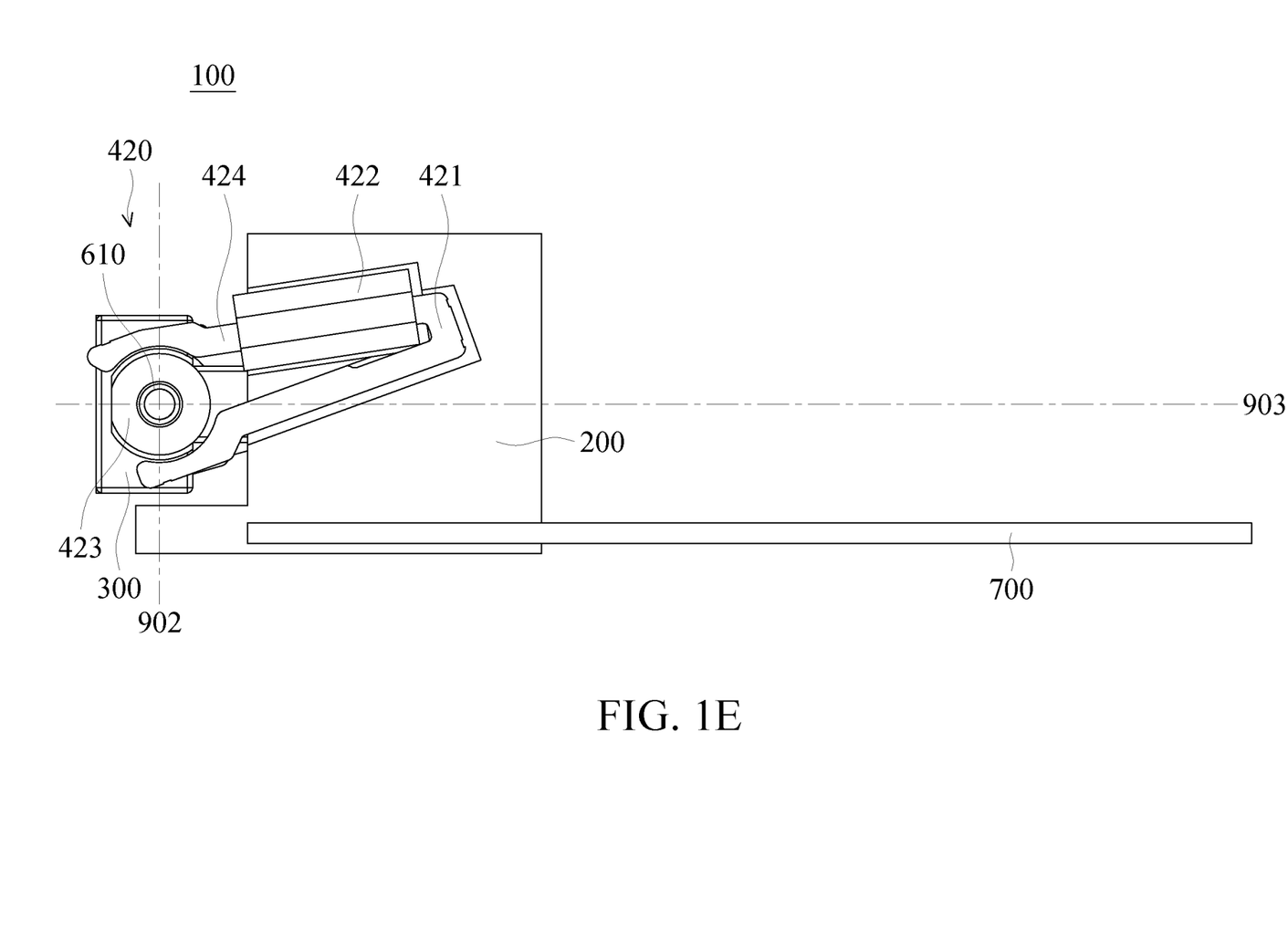

FIG. 1A, FIG. 1B, FIG. 1C, and FIG. 1E are schematic views of an optical element driving mechanism 100 viewed from different directions in some embodiments of the present disclosure. FIG. 1D is an enlarged view of FIG. 1C.

The optical element driving mechanism 100 may include a fixed portion 200, a movable portion 300, a driving assembly 400, a sensing assembly 500, a support assembly 600, a circuit assembly 700, and may be used for driving an optical element 800.

In some embodiments, the optical element 800 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure. Therefore, the type and function of the optical element 800 may be different, and suitable optical element 800 may be chosen based on actual requirement.

In some embodiments, the optical element 800 may be disposed on the movable portion 300, and the movable portion 300 is movable relative to the fixed portion 200, so the optical element 800 is movable relative to the fixed portion 200 to achieve functions like detection, scanning, or projection.

In some embodiments, the driving assembly 400 may include, for example, a first driving portion 410 (including a first magnetic permeable element 411, a first coil 412, and a first magnetic element 413) disposed on one side of the fixed portion 200 and the movable portion 300, and a second driving portion 420 (including a second magnetic permeable element 421, a second coil 422, and a second magnetic element 423) disposed on another side of the fixed portion 200 and the movable portion 300. The driving assembly 400 may be used for driving the optical element 800 to move relative to the fixed portion 200 in a first dimension, such as rotation taking an axis parallel to a first axis 901 as the rotational axis. The first axis 901 may pass through the intermediate element 610 and parallel to the intermediate element 610.

In some embodiments, the first coil 412 may be disposed on the first magnetic permeable element 411, and the first magnetic element 413 may be disposed on the intermediate element 610 and may correspond to a first magnetic permeable portion 414 of the first magnetic permeable element 411. For example, the intermediate element 610 may pass through the first magnetic element 413, the rotational axis of the optical element 800 may pass through the intermediate element 610, and the first magnetic permeable portion 414 may be adjacent to the rotational axis. The first magnetic permeable portion 414 may have an arc-shaped surface surrounding the rotational axis.

In a direction that the first axis 901 extends, a distance between a center of the first magnetic permeable portion 414 and a center of the first magnetic element 413 is greater than 0. Moreover, when viewed along the first axis 901 or the second axis 902, the first magnetic element 413 and the first magnetic permeable portion 414 do not overlap each other. In the direction that the first axis 901 extends, the first connecting element 620 and the first magnetic element 413 may partially overlap each other to reduce the size in other directions, so miniaturization may be achieved.

In some embodiments, the second coil 422 may be disposed on the second magnetic permeable element 421, and the second magnetic element 423 may be disposed on the intermediate element 610 and may correspond to a second magnetic permeable portion 424 of the second magnetic permeable element 421. For example, the intermediate element 610 may pass through the second magnetic element 423, the rotational axis of the optical element 800 may pass through the intermediate element 610, and the second magnetic permeable portion 424 may be adjacent to the rotational axis. The second magnetic permeable portion 424 may have an arc-shaped surface surrounding the rotational axis.

In a direction that the first axis 901 extends, a distance between a center of the second magnetic permeable portion 424 and a center of the second magnetic element 423 is greater than 0. Moreover, the second axis 902 may be perpendicular to the first axis 901 and the plate-shaped circuit assembly 700. When viewed along the first axis 901 or the second axis 902, the second magnetic element 423 and the second magnetic permeable portion 424 do not overlap each other. In the direction that the first axis 901 extends, the first connecting element 620 and the second magnetic element 423 may partially overlap each other to reduce the size in other directions, so miniaturization may be achieved.

In some embodiments, when viewed in the first direction, the first connecting element 620 and the second connecting element 630 may be between the first magnetic element 413 and the second magnetic element 423, and the third opening 310 does not overlap the first magnetic element 413 and the second magnetic element 423.

In some embodiments, in the direction that the first axis 901 extends, the centers of the first magnetic permeable element 411 and the second magnetic permeable element 421 do not overlap each other, or the entire first magnetic permeable element 411 and the entire second magnetic permeable element 421 do not overlap each other. Moreover, the winding axis of the first magnetic permeable element 411 and the winding axis of the first coil 412 are not parallel, and the winding axes are not parallel and perpendicular to the second axis 902.

Figure 2A:
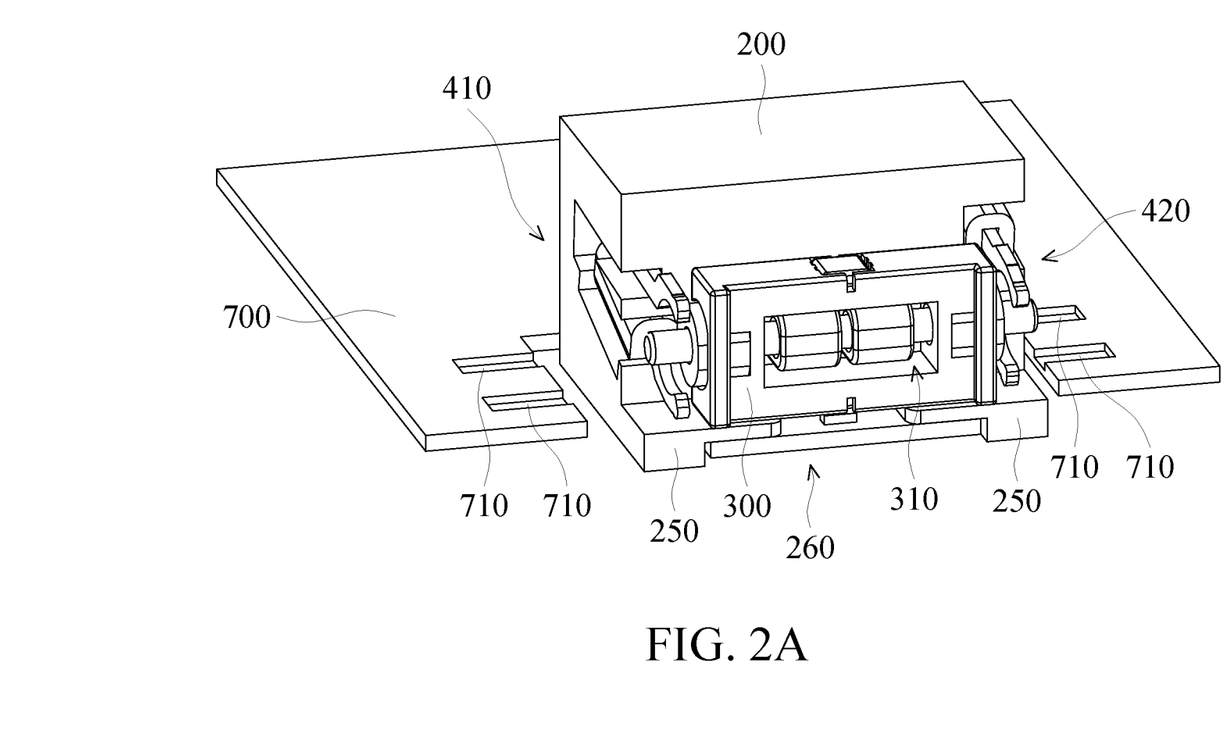
FIG. 2A and FIG. 2B are schematic views of the optical element driving mechanism, wherein the optical element is omitted.
Figure 2B:
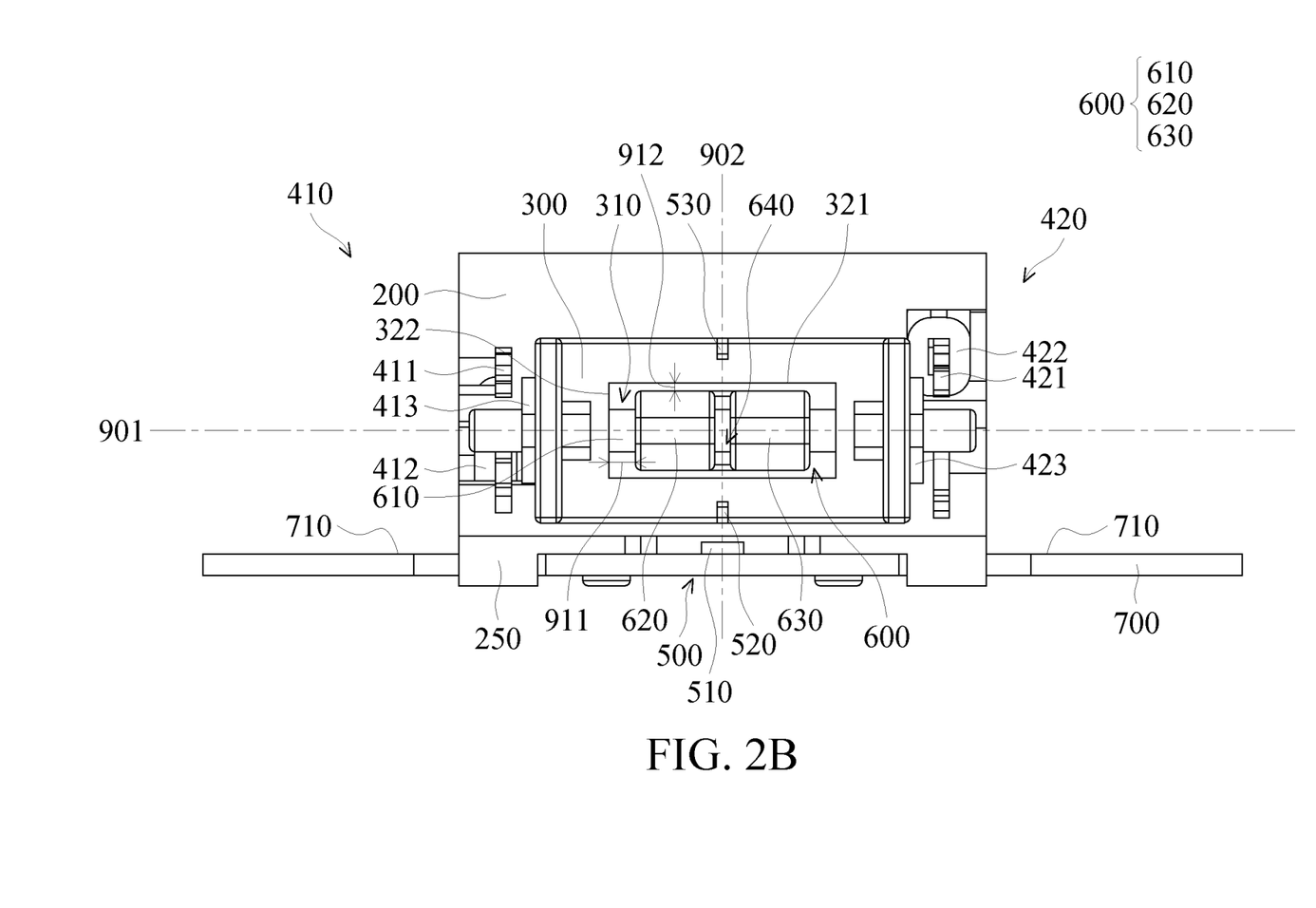
Figure 2C:
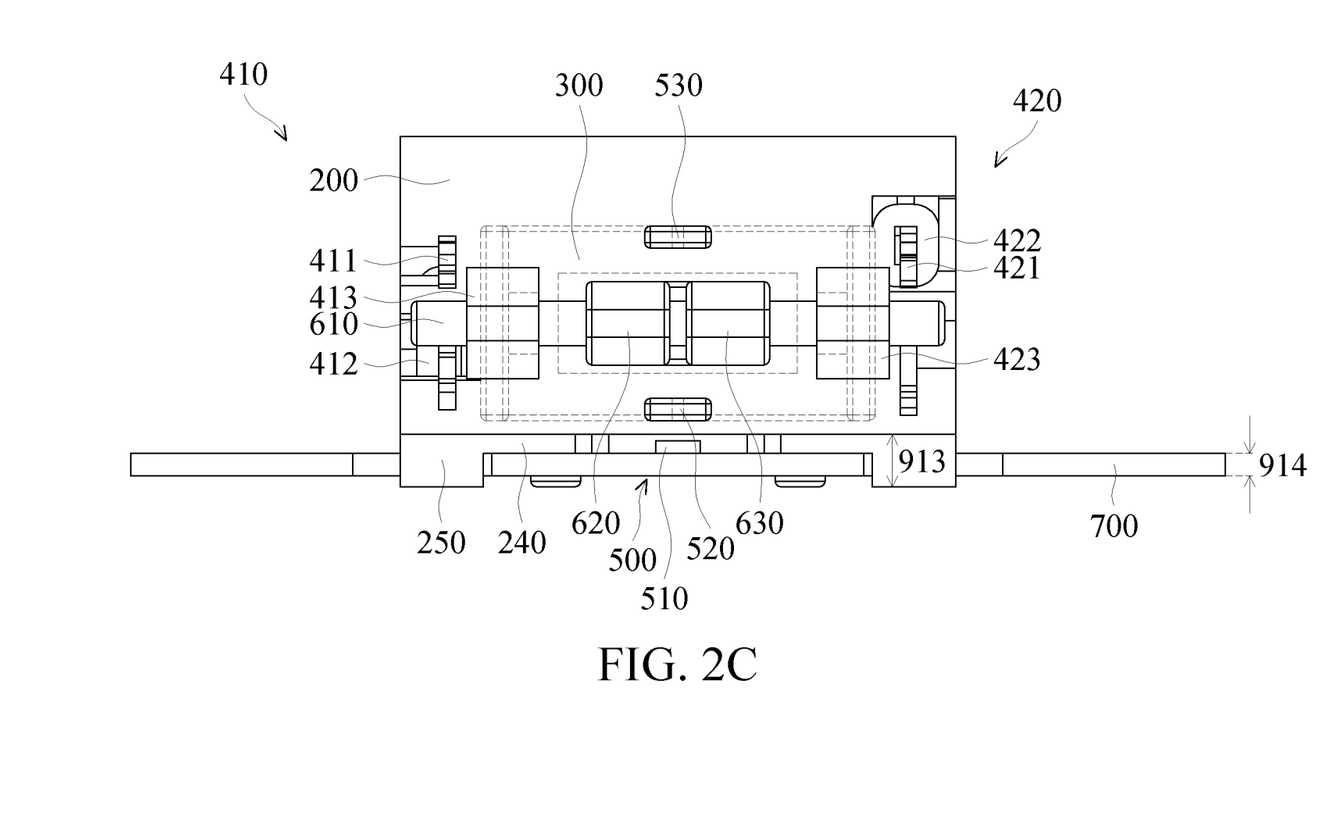
FIG. 2C and FIG. 2D are schematic views of some elements of the optical element driving mechanism.
Figure 2D:
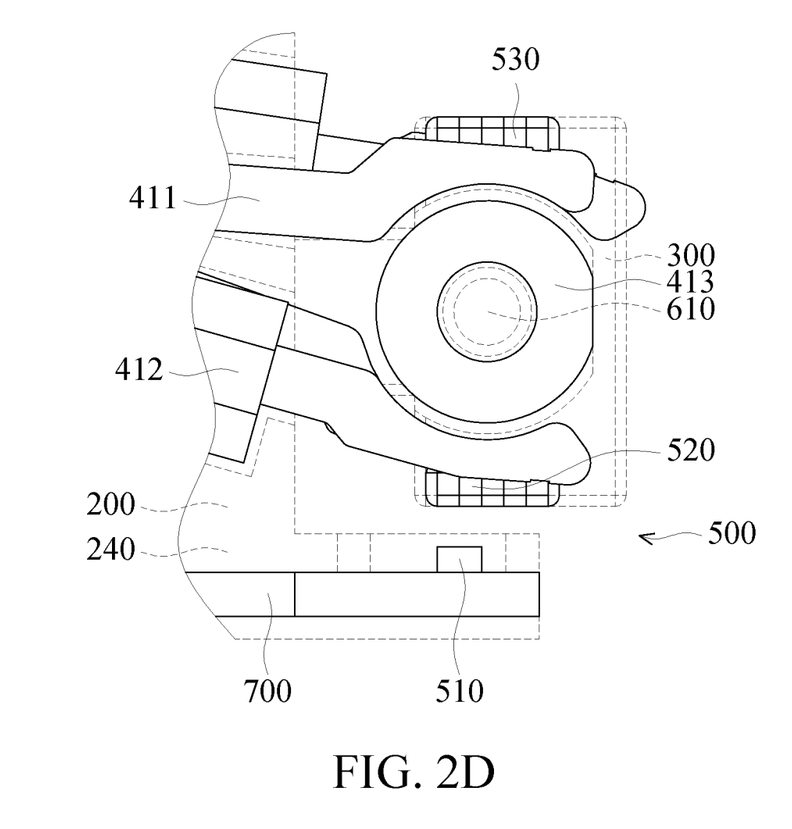

FIG. 2A and FIG. 2B are schematic views of the optical element driving mechanism 100, wherein the optical element 800 is omitted. FIG. 2C and FIG. 2D are schematic views of some elements of the optical element driving mechanism 100, wherein the elements behind the movable portion 300 are further shown.

In some embodiments, the sensing assembly 500 may be used for detecting the movement of the optical element 800 relative to the fixed portion 200, and may include a sensing element 510, a second reference element 520, and a balance element 530. In some embodiments, the sensing element 510 may correspond to the second reference element 520, such as overlap each other in the Z direction, and the sensing element 510 and the second reference element 520 may be respectively disposed on the fixed portion 200 and the movable portion 300, or their positions may be interchanged, depending on design requirement.

In some embodiments, the sensing element 510 may include a Hall sensor, a magnetoresistance effect sensor (MR sensor), a giant magnetoresistance effect sensor (GMR sensor), a tunneling magnetoresistance effect sensor (TMR sensor), or a fluxgate sensor. Therefore, the sensing element 510 may detect the magnetic field variation of the second reference element 520 to get the position of the movable portion 300 relative to the fixed portion 200 when the movable portion 300 moving relative to the fixed portion 200.

In some embodiments, the balance element 530 may include magnet, and the second reference element 520 and the balance element 530 may be disposed on opposite sides of the movable portion 300 to balance the weight on different sides of the movable portion 300. In some embodiments, the first connecting element 620 may be between the second reference element 520 and the balance element 530. In a direction that the second axis 902 extends, the second reference element 520 and the balance element 530 at least partially overlap each other. In some embodiments, the first coil 412 and the first magnetic element 413 may arrange in a direction (e.g., a direction that the first axis 901 extends) different from a direction that the second reference element 520 and the sensing element 510 arranged (e.g., the direction that the second axis 902 extends).

Figure 3A:
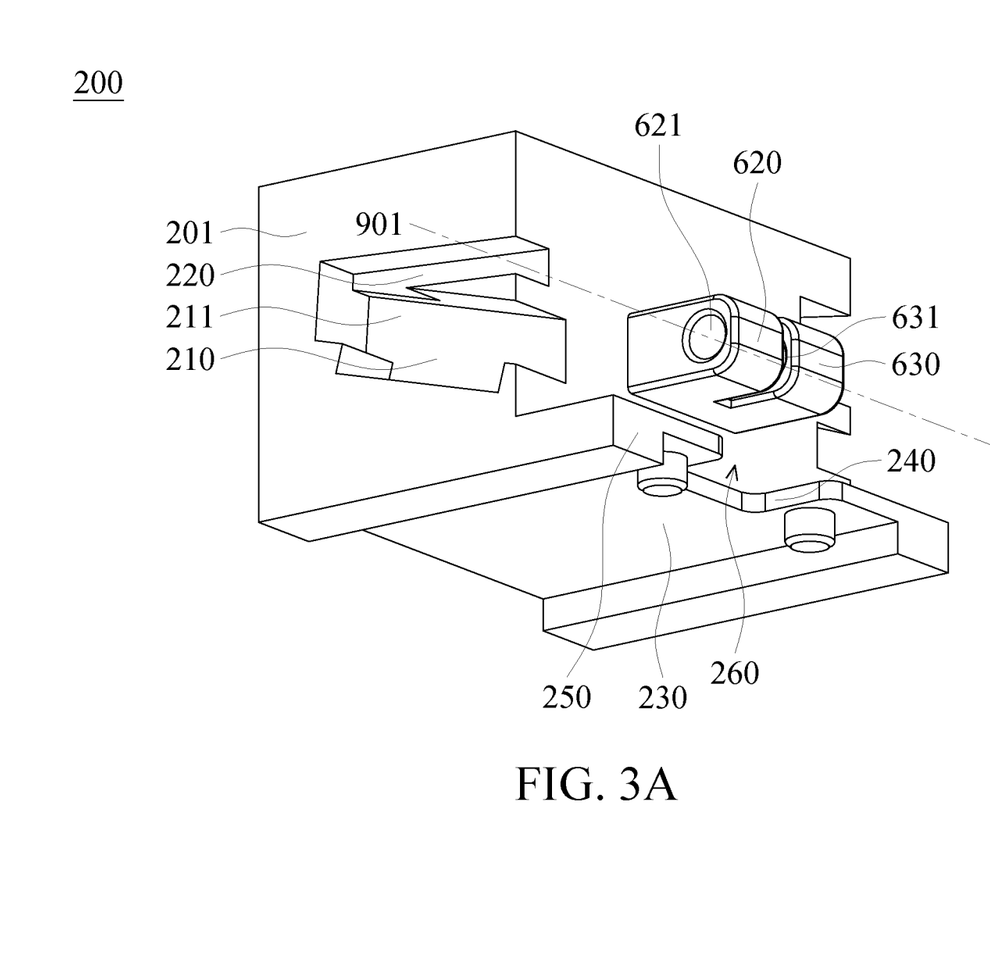
FIG. 3A and FIG. 3B are schematic views of the fixed portion.
Figure 3B:
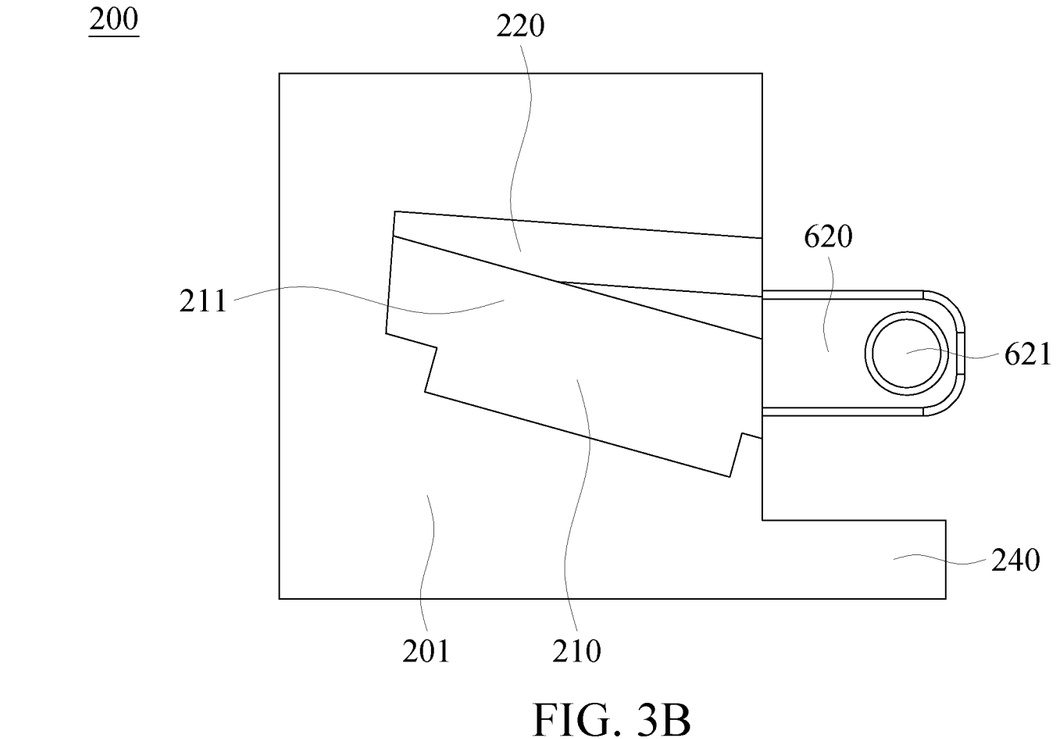

In some embodiments, the support assembly 600 may include an intermediate element 610, a first connecting element 620, and a second connecting element 630. FIG. 3A and FIG. 3B are schematic views of the fixed portion 200. The optical element 800 is movable relative to the fixed portion 200 through the support assembly 600. The intermediate element 610 may be strip-shaped and may extend along the first axis 901. The first connecting element 620 and the second connecting element 630 may be disposed on the fixed portion 200, and may have a first opening 621 and a second opening 631, respectively. The first opening 621 and the second opening 631 are used for accommodating at least a portion of the intermediate element 610. In some embodiments, the first opening 621 and the second opening 631 may have closed structures, which means they can be O-shaped instead of U-shaped, so the position of the intermediate element 610 may be defined.

In some embodiments, when viewed in a first direction that is perpendicular to the first axis 901 and the second axis 902, such as shown in FIG. 2B, the first connecting element 620 is closer to the center of the optical element 800 than the driving assembly 400, the first direction is perpendicular to the first axis 901 and the second axis 902, and the third axis 903 may be parallel to the first direction. In some embodiments, a first gap 640 may be between the first connecting element 620 and the second connecting element 630, and the center of the optical element 800 may overlap the first gap 640 when viewed in the first direction. In some embodiments, the third opening 310 of the movable portion 300 may correspond to the first connecting element 620 and the second connecting element 630, such as the first connecting element 620 and the second connecting element 630 may be disposed in the third opening 310. When viewed in the first direction, at least a portion of the first connecting element 620 and the second connecting element 630 may expose from the third opening 310.

In some embodiments, the movable portion 300 may include a first movable portion surface 321 and a second movable portion surface 322 facing the first connecting element 620 and the second connecting element 630. The first movable portion surface 321 may be perpendicular to the second axis 902, and the second movable portion surface 322 may be perpendicular to the first axis 901. In other words, the first movable portion surface 321 and the second movable portion surface 322 may be not parallel to each other, such as may be perpendicular.

In some embodiments, a distance 912 between the first movable portion surface 321 and the first connecting element 620 may be different from a distance 911 between the second movable portion surface 322 and the first connecting element 620. For example, the distance 912 may be less than the distance 911. Moreover, the first gap 640 may be less than the distance 911 and may be greater than the distance 912.

In some embodiments, as shown in FIG. 3A, the fixed portion 200 may further include a first fixed portion surface 201, a first accommodating portion 210, and a second accommodating portion 220. The first accommodating portion 210 may be used for accommodating the first coil 412, and the second accommodating portion 220 may be used for accommodating the first magnetic permeable element 411 to protect the first magnetic permeable element 411 and the first coil 412. The first accommodating portion 210 and the second accommodating portion 220 may be formed on the first fixed portion surface 201, and the depth of the second accommodating portion 220 may be less than the depth of the first accommodating portion 210 to allow the first coil 412 being accommodated in the deeper first accommodating portion 210. In some embodiments, the first accommodating portion 210 may include a first accommodating portion surface 211 facing the first coil 412, and the first accommodating portion surface 211 may be perpendicular to the first axis 901.

In some embodiments, a second gap 212 may be between the first accommodating portion 210 and the first coil 412, and a first adhesive element 270 (e.g., glue) may be disposed in the second gap 212 to allow the first coil 412 affix on the fixed portion 200. In some embodiments, the first adhesive element 270 may be in direct contact with the first accommodating portion surface 211 and at least partially in the second gap 212.

In some embodiments, the circuit assembly 700 may be disposed on the fixed portion 200 and may be electrically connected to the driving assembly 400 and the sensing assembly 500, such as may be electrically connected to the first coil 412 and the second coil 422 to provide signal to the driving assembly 400 and receive the signal detected by the sensing assembly 500 to control the driving assembly 400 by this signal.

In some embodiments, the fixed portion 200 may further include a bottom surface 230, a bottom plate 240, a first block wall 250, and a fourth opening 260. The bottom surface 230 faces the circuit assembly 700 (e.g., perpendicular to the second axis 902) and is on the bottom plate 240. The first block wall 250 may protrude from the bottom surface 230. In some embodiments, the fourth opening 260 may form on the bottom plate 240, correspond to the sensing assembly 500, and accommodate a portion of the circuit assembly 700. When viewed along the first axis 901, as shown in FIG. 2D, the bottom plate 240 and the sensing assembly 500 may at least partially overlap each other, such as the bottom plate 240 may overlap the sensing element 510. Moreover, as shown in FIG. 2C, a height 913 of the first block wall 250 may be greater than a thickness 914 of the circuit assembly 700 that is plate-shaped, so the circuit assembly 700 may be protected.

In some embodiments, as shown in FIG. 2A, a first electrical connecting portion 710 may be formed on the circuit assembly 700, and the first block wall 250 may be between the first electrical connecting portion 710 and the driving assembly 400 when viewed along the first axis 901. The first coil 412 and the second coil 422 may electrically connect to the circuit assembly 700 through the first electrical connecting portion 710 to provide control signal to the first coil 412 and the second coil 422.

In summary, an optical element driving mechanism is provided and used for driving an optical element. The optical element driving mechanism includes a fixed portion, a driving assembly, and a support assembly. The driving assembly is used for driving the optical element to move relative to the fixed portion in a first dimension. The optical element is movable relative to the fixed portion through the support assembly. Therefore, functions like detection, scanning, and projection may be achieved, and miniaturization may be achieved as well.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism used for driving an optical element, comprising:
    a fixed portion;
    a driving assembly used for driving the optical element to move relative to the fixed portion in a first dimension;
    a support assembly, wherein the optical element is movable relative to the fixed portion through the support assembly, and the support assembly comprises:
        an intermediate element, wherein the intermediate element is strip-shaped and extending along a first axis;
        a first connecting element having a first opening used for accommodating at least a portion of the intermediate element; and
        a second connecting element having a second opening used for accommodating at least a portion of the intermediate element;
    a movable portion, comprising:
        a first movable portion surface facing the first connecting element; and
        a second movable portion surface facing the first connecting element;
    wherein:
    a first gap is between the first connecting element and the second connecting element;
    the first gap is greater than a minimum distance between the first movable portion surface and the first connecting element;
    the first gap is less than a minimum distance between the second movable portion surface and the first connecting element.

2. The optical element driving mechanism as claimed in claim 1, wherein:
    the first opening has a closed structure;
    when viewed in a first direction, the first connecting element is closer to a center of the optical element than the driving assembly;
    the first direction and the first axis are perpendicular;
    a second axis is perpendicular to the first axis;
    the second axis is perpendicular to the first direction; and
    a third axis is parallel to the first direction.

3. The optical element driving mechanism as claimed in claim 2, wherein:
    the second opening has a closed structure;
    a center of the optical element overlaps the first gap when viewed in the first direction; and
    the movable portion is used for connecting to the optical element and being movable relative to the fixed portion.

4. The optical element driving mechanism as claimed in claim 3, wherein:
    the movable portion has a third opening corresponding to the first connecting element;
    the third opening corresponds to the second connecting element; and
    at least a portion of the first connecting element is exposed from the third opening when viewed in the first direction.

5. The optical element driving mechanism as claimed in claim 4, wherein:
    the first movable portion surface is perpendicular to the second axis;
    the first movable portion surface and the second movable portion surface are not parallel; and
    the second movable portion surface is perpendicular to the first axis.

6. The optical element driving mechanism as claimed in claim 5, wherein:
    the minimum distance between the first movable portion surface and the first connecting element is less than the minimum distance between the second movable portion surface and the first connecting element;
    the first movable portion surface and the second movable portion surface are perpendicular;
    the first dimension is rotation relative to a rotational axis; and
    the rotational axis is parallel to the first axis.

7. The optical element driving mechanism as claimed in claim 6, wherein the driving assembly comprises:
   a first magnetic permeable element comprising a first magnetic permeable portion;
   a first coil disposed on the first magnetic permeable element; and
   a first magnetic element corresponding to the first magnetic permeable portion.

8. The optical element driving mechanism as claimed in claim 7, wherein:
   the intermediate element passes through the first magnetic element;
   the first magnetic permeable portion is adjacent to the rotational axis;
   the first magnetic permeable portion has an arc-shaped surface facing the rotational axis; and
   a distance between a center of the first magnetic permeable portion and a center of the first magnetic element is greater than 0 in the first axis.

9. The optical element driving mechanism as claimed in claim 8, wherein:
   the first magnetic element does not overlap the first magnetic permeable portion when viewed along the first axis;
   the first magnetic element does not overlap the first magnetic permeable portion when viewed along the second axis; and
   at least a portion of the first connecting element overlaps the first magnetic element in a direction that the first axis extends.

10. The optical element driving mechanism as claimed in claim 9, wherein the driving assembly further comprises:
    a second magnetic permeable element comprising a second magnetic permeable portion;
    a second coil disposed on the second magnetic permeable element; and
    a second magnetic element corresponding to the second magnetic permeable portion.

11. The optical element driving mechanism as claimed in claim 10, wherein:
    the intermediate element passes through the second magnetic element;
    the first connecting element is between the first magnetic element and the second magnetic element when viewed in the first direction;
    the third opening and the first magnetic element do not overlap each other when viewed in the first direction;
    the third opening and the second magnetic element do not overlap each other when viewed in the first direction; and
    centers of the first coil and the second coil do not overlap each other in the direction that the first axis extends.

12. The optical element driving mechanism as claimed in claim 11, wherein:
    a winding axis of the first coil is not parallel to a winding axis of the second coil;
    the winding axis of the first coil is not parallel to the second axis;
    the winding axis of the first coil is not perpendicular to the second axis;
    the winding axis of the second coil is not parallel to the second axis; and
    the winding axis of the second coil is not perpendicular to the second axis.

13. The optical element driving mechanism as claimed in claim 12, wherein the fixed portion comprises:
    a first fixed portion surface;
    a first accommodating portion used for accommodating the first coil; and
    a second accommodating portion used for accommodating the first magnetic permeable element.

14. The optical element driving mechanism as claimed in claim 13, wherein:
    the first accommodating portion is formed on the first fixed portion surface;
    the second accommodating portion is formed on the first fixed portion surface;
    a depth of the second accommodating portion is less than a depth of the first accommodating portion;
    the first accommodating portion has a first accommodating portion surface facing the first coil;
    the first accommodating portion surface is perpendicular to the first axis;
    a second gap is between the first accommodating portion and the first coil;
    the first coil is affixed on the fixed portion through a first adhesive element;
    the first adhesive element is in direct contact with the first accommodating portion surface;
    at least a portion of the first adhesive element is in the second gap; and
    the first coil and the second coil do not overlap each other in the direction that the first axis extends.

15. The optical element driving mechanism as claimed in claim 14, further comprising a sensing assembly used for detecting the movement of the movable portion relative to the fixed portion;
    wherein the sensing assembly comprises:
    a first reference element;
    a sensing element corresponding to the first reference element; and
    a balance element, wherein the first connecting element is between the first reference element and the balance element;
    wherein:
    the first coil and the first magnetic element are arranged in a direction different to a direction that the first reference element and the sensing element arranged;
    at least a portion of the first reference element overlaps the balance element in a direction that the second axis extends;
    the first reference element comprises magnet; and
    the balance element comprises magnet.

16. The optical element driving mechanism as claimed in claim 15, further comprising a circuit element electrically connected to the sensing assembly;
    wherein:
    the first coil is electrically connected to the circuit assembly;
    the fixed portion further comprises:
       a bottom surface facing the circuit assembly;
       a bottom plate, wherein the bottom surface is on the bottom plate;
       a first block wall protruding from the bottom surface; and
       a fourth opening corresponding to the sensing assembly.

17. The optical element driving mechanism as claimed in claim 16, wherein:
    the bottom surface is perpendicular to the second axis;
    the fourth opening is formed on the bottom plate;
    at least a portion of the bottom plate overlaps the sensing assembly when viewed along the first axis;
    the circuit assembly is plate-shaped;

a height of the first block wall is greater than a thickness of the circuit assembly;

the circuit assembly comprises a first electrical connecting portion;

the first block wall is between the first electrical connecting portion and the driving assembly when viewed along the second axis;

the first coil is electrically connected to the circuit assembly through the first electrical connecting portion; and a center of the first reference element overlaps a center of the balance element in the direction that the second axis extends.

\* \* \* \* \*